US012756090B2

(12) United States Patent
Singhvi et al.

(10) Patent No.: US 12,756,090 B2
(45) Date of Patent: Oct. 6, 2026

(54) COMPACT WIDEBAND LTE IOT METAL STAMPED ANTENNA FOR WATER METER

(71) Applicant: Honeywell International Inc., Charlotte, NC (US)

(72) Inventors: Shalu Singhvi, Hyderabad (IN); Steven Osborne, Nottingham (GB)

(73) Assignee: Honeywell International Inc., Charlotte, NC (US)

( * ) Notice: Subject to any disclaimer, the term of this patent is extended or adjusted under 35 U.S.C. 154(b) by 85 days.

(21) Appl. No.: 18/655,555

(22) Filed: May 6, 2024

(65) Prior Publication Data

US 2025/0337156 A1 Oct. 30, 2025

(30) Foreign Application Priority Data

Apr. 24, 2024 (IN) ............................ 202411032460

(51) Int. Cl.

*H01Q 1/38* (2006.01)
*H01Q 1/24* (2006.01)
*H01Q 9/04* (2006.01)

(52) U.S. Cl.

CPC ............... *H01Q 1/38* (2013.01); *H01Q 1/244* (2013.01); *H01Q 9/0414* (2013.01)

(58) Field of Classification Search

CPC .......... H01Q 21/065; H01Q 1/02; H01Q 1/42; H01Q 1/38; H01Q 1/2283; H01Q 23/00;
(Continued)

(56) References Cited

U.S. PATENT DOCUMENTS 6,992,627 B1 * 1/2006 Honda ................. H01Q 9/0421 343/702
8,648,752 B2 * 2/2014 Ramachandran ...... H01Q 21/28 343/702
(Continued)

FOREIGN PATENT DOCUMENTS

CN 108151813 A 2/2018
CN 113471662 A 10/2021
(Continued)

OTHER PUBLICATIONS

Inderpreet Kaur, et al., "Annular Ring Ultra Wideband Antenna Integrated With Metallic via Array for IoT Applications," accepted Jul. 6, 2022, date of publication Jul. 7, 2022, date of current version Jul. 18, 2022. Digital Object Identifier 10.1109/ACCESS.2022.3189573.

*Primary Examiner* — Wei (Victor) Y Chan
(74) *Attorney, Agent, or Firm* — Ingrassia Fisher & Lorenz

(57) ABSTRACT

An antenna assembly and a method of configuring the antenna assembly can include a ground plane on a printed circuit board, a plastic substrate that supports an antenna, a metal radiating element mounted to the plastic substrate, and a radiating element mounted above the ground plane and including multiple branches above the ground plane to achieve wideband frequencies. A feeding leg can support a first branch of the radiating element above the ground plane and can electrically couple the first branch to an RF feeding port and impedance matching network. A ground leg can support a second branch of the radiating element above the ground plane and can electrically couple the second branch to the ground plane.

6 Claims, 3 Drawing Sheets

(58) Field of Classification Search
CPC .. H01Q 1/1228; H01Q 9/0407; H01Q 9/0414; H01Q 1/1207; H01Q 1/125; H01Q 1/2291
See application file for complete search history.

(56) References Cited

U.S. PATENT DOCUMENTS

| | | | | |
|---|---|---|---|---|
| 9,093,744 | B2 | 7/2015 | Seal et al. | |
| 9,658,090 | B2 | 5/2017 | Nielsen | |
| 10,680,337 | B2 | 6/2020 | Kim et al. | |
| 11,680,865 | B2 | 6/2023 | Fleury, Jr. et al. | |
| 2010/0225551 | A1* | 9/2010 | Yang | H01Q 21/30 343/749 |
| 2011/0309985 | A1* | 12/2011 | He | H01Q 5/371 343/700 MS |

FOREIGN PATENT DOCUMENTS

| | | | |
|---|---|---|---|
| CN | 116337169 | A | 6/2023 |
| EP | 2930786 | A2 | 10/2015 |

* cited by examiner

COMPACT WIDEBAND LTE IOT METAL STAMPED ANTENNA FOR WATER METER

CROSS-REFERENCE TO RELATED PATENT APPLICATION

This patent application claims priority to Indian Provisional Patent Application No. 202411032460, filed Apr. 24, 2024, which is incorporated herein by reference in its entirety.

TECHNICAL FIELD

Embodiments are generally related to devices for transmitting or receiving electromagnetic waves, including antennas used in communication, wireless networks, and other applications. Embodiments further relate to antennas and in particular wideband antennas used with battery powered devices such as gas and water meters. Embodiments also relate to metering devices that are equipped with wireless communications devices and systems that can support multiple frequency bands.

BACKGROUND

LTE CAT NB1, also referred to as Narrowband IoT (NB-IoT), is a communications technology categorized under Low Power Wide Area (LPWA) systems. This communications technology has been specifically designed to facilitate connectivity for a diverse array of devices within the Internet of Things (IoT) ecosystem, while leveraging existing mobile networks. NB-IoT can operate as a low power, narrowband solution capable of facilitating efficient, secure, and reliable two-way data transmission.

In the context of LTE technology, "CAT" stands for "Category." LTE Category (CAT) refers to the different classes or versions of LTE standards defined by the 3rd Generation Partnership Project (3GPP), which is the organization responsible for standardizing cellular telecommunications technologies. These categories define various performance characteristics and capabilities of LTE devices, including maximum data rates, modulation schemes, and supported features.

In the case of LTE CAT NB1 (Narrowband IoT), CAT represents a specific category within the LTE standard tailored for narrowband IoT applications. NB-IoT has been designed to provide connectivity for IoT devices with low data rate requirements and operates in a narrowband spectrum, making it suitable for applications such as sensor monitoring, asset tracking, and smart metering.

NB-IoT is gaining prominence as a preferred LPWAN option, particularly for battery-powered devices such as gas and water metering systems. Its widespread coverage, coupled with its dependable and secure communication capabilities, along with its low energy consumption, makes it an attractive choice for such applications.

Water meters employing NB-IoT technology as a communications medium must accommodate the requirements of various frequency bands dictated by different network providers (carriers) and geographical locations. Ensuring connectivity ubiquity demands support for a total of five frequency bands, namely B1 (2100 MHz), B3 (1800 MHz), B5 (850 MHz), B8 (900 MHz), and B20 (800 MHz).

Maintaining wireless connection efficiency and reliability across all five frequency bands necessitates a minimum Total Radiated Power (TRP) of 18 dBm. However, achieving optimal antenna radiation performance within the constraints of water meter design presents significant challenges. Water meters typically have limited overall height, approximately 85-90 mm, due to installation considerations such as placement within pits. Additionally, the presence of other active or metal components, such as LCD screens, metal flow tubes, ultrasonic sensors, NFC communications modules, and batteries, in close proximity further complicates antenna design and performance.

Moreover, water meter electronics are often encapsulated or potted to safeguard them from harsh environmental conditions, introducing additional obstacles to achieving the required antenna radiation performance. Mass manufacturing introduces variations in antenna metal structures during assembly, leading to inconsistencies in antenna performance. Additionally, the presence of potting materials can degrade the performance of RF connectors, further impacting overall system reliability and efficiency.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved antenna assembly that can be adapted for use with metering devices such as gas meters and water maters.

It is another aspect of the embodiments to provide for a method of configuring the improved antenna assembly.

It is also an aspect of the embodiments to provide for an improved wideband antenna.

It is a further aspect of the embodiments to provide for an antenna assembly that includes a PIFA quarter wavelength LTE IoT antennas for wideband frequencies with an enhanced radiation performance.

The aforementioned aspects and other objectives can now be achieved as described herein. An antenna assembly can include a ground plane on a printed circuit board, a plastic substrate that supports an antenna, a metal radiating element mounted to the plastic substrate, and a radiating element mounted above the ground plane and including multiple branches above the ground plane to achieve wideband frequencies.

In an embodiment of the antenna assembly, a feeding leg can support a first branch of the radiating element above the ground plane and can electrically couple the first branch to an RF feeding port and an impedance matching network.

In an embodiment of the antenna assembly, a ground leg can support a second branch of the radiating element above the ground plane and can electrically couple the second branch to the ground plane.

In an embodiment of the antenna assembly, a second plastic substrate may be implemented to control antenna radiation performance variation for mass manufacturing of the antenna.

In an embodiment of the antenna assembly, the antenna can include an antenna metal structure.

In an embodiment of the antenna assembly, the antenna can include a quarter wavelength antenna structure/pattern bent to fit in a limited area and in proximity to a plurality of metal components and slotted to achieve wideband band frequencies).

In an embodiment of the antenna assembly, the antenna can be configured with two-point soldering and a press fit.

In an embodiment of the antenna assembly, the antenna can be directly solderable to an RF feeding port.

In an embodiment of the antenna assembly, antenna can be partially potted.

In an embodiment, a method for configuring an antenna assembly, can involve attaching an antenna to an electronic printed circuit board (PCB) utilizing a dual-point solder connection and a mechanical press attachment, and modifying the antenna to achieve a desired omni-directional radiation performance while adhering to size constraints for the antenna and accommodating a presence of metal components in close proximity to the antenna assembly.

In an embodiment of the method, the dual-point solder connection can be provided or facilitated by two-point soldering.

In an embodiment of the method, mechanical press attachment can be implemented by press fitting of the antenna to the electronic PCB.

An embodiment of the method can further involve configuring a gasket to protect electronics through antenna soldering joints against dust and water ingress.

In an embodiment of the method, the antenna can be a quarter wavelength LTE IoT antenna with a planar inverted structure.

In an embodiment of the method, the antenna can operate across wideband frequencies ranging from approximately 800 MHz to 2100 MHz.

In an embodiment of the method, antenna can operate with a radiation performance exceeding 18 dBm.

In another embodiment, antenna assembly can include an antenna attached to an electronic printed circuit board (PCB) utilizing a dual-point solder connection and a mechanical press attachment, wherein the configured is modified to achieve a desired omni-directional radiation performance while adhering to size constraints for the antenna and accommodating a presence of metal components in close proximity to the antenna assembly.

In an embodiment, the dual-point solder connection can be provided by two-point soldering and the mechanical press attachment can be provided by press fitting of the antenna to the electronic PCB.

In an embodiment, gasket can be operable to protect electronics through antenna soldering joints against dust and water ingress.

In embodiment, the antenna can comprise a quarter wavelength LTE IoT antenna with a planar inverted structure, and the antenna is operable across wideband frequencies ranging from, for example, approximately 800 MHz to 2100 MHz. Furthermore, the antenna is operable with a radiation performance exceeding, for example, 18 dBm.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

In the drawings described and illustrated herein, identical or similar parts and elements are generally indicated by identical reference numerals.

DETAILED DESCRIPTION

Figure 1:
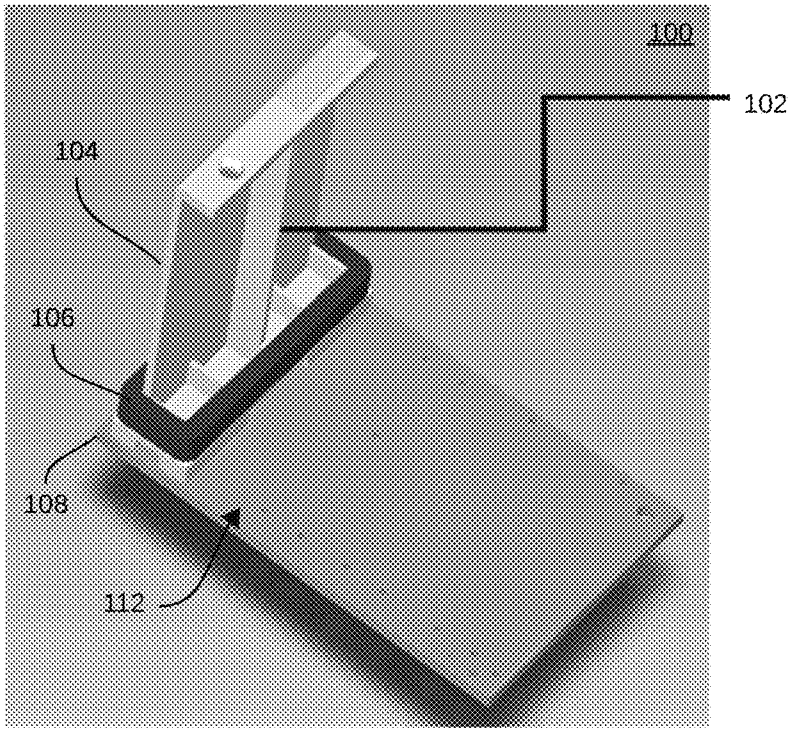
FIG. 1 illustrates a top perspective view of an antenna assembly, which can be in implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the terms "one or more" or "at least one" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term “at least one” as utilized herein can refer to “one or more”. For example, “at least one widget” may refer to “one or more widgets”.

Figure 2:
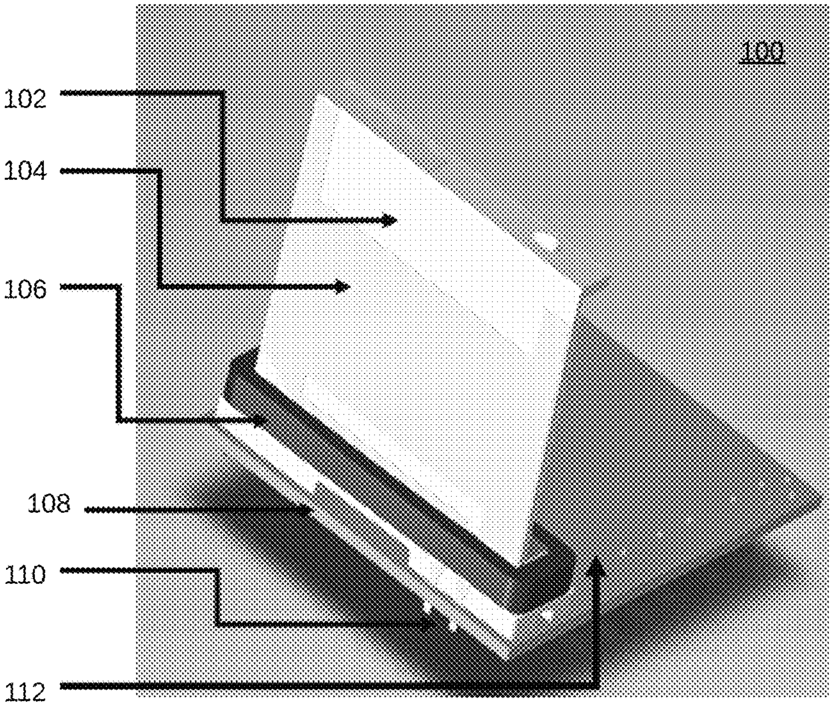
FIG. 2 illustrates a side perspective view of the antenna assembly, in accordance with an embodiment.

FIG. 1 illustrates a top perspective view of an antenna assembly 100, which can be in implemented in accordance with an embodiment. FIG. 2 illustrates a side perspective view of the antenna assembly 100, in accordance with an embodiment. As shown in FIG. 1, the antenna assembly 100 can include a polymer antenna support 102 and a metal formed antenna 104. The metal formed antenna 104 is surrounded by a gasket 106 located above a PCBA 108 with respect to a ground plane 112. FIG. 2 depicts additional features such as a connector/solder leg 110 (e.g., PCBA).

The antenna assembly 100 can function as a low-cost multiple frequency bands 800-2100 MHz LTE IoT antenna adapted for use with a sensor such as, for example, a static water meter. The antenna 100 employs a metal stamped radiating part (e.g., the metal formed antenna 102), which can be mounted to a plastic substrate. The plastic substrate can support the antenna structure to control the antenna radiation performance variation for mass manufacturing.

The antenna assembly 100 may have only one feeding point for electrical coupling with an RF feeding port. A partial length of a feeding leg (e.g., such as the feeding leg 107 shown in FIG. 7) can be placed under potting to protect the electronics from water. In addition, the feeder leg partial length and radiating element(s) may be kept above the potting material to achieve required radiation performance. These features can be facilitated through the use of the gasket 106.

The antenna mechanical structure of the antenna assembly 100 uniquely polarized in a manner that can achieve omni-directional radiation performance from low frequency to high frequency bands. The antenna assembly 100 can be easily mass-manufactured because only two-point soldering and press fitting may be required to attach the antenna with electronic PCB. Note the term “press fitting” and related terms such as “press fit” can involve assembling of the antenna 104 into the PCB by pushing it into mounting holes, with no screw or specific tool required.

The antenna plastic structure of the antenna assembly 100 can be designed to support the radiating element to control variations and to support an electronic printed circuit board (PCB) with multiple ribs. The antenna plastic structure of the antenna assembly 100 can also be designed in a manner that allows for easy flow of potting material to protect the electronics.

The antenna assembly 100 can utilize the polymer antenna support 102 and the metal formed antenna 104 to create a low-cost, multiple frequency bands (800-2100 MHz LTE IoT) antenna suitable for various applications such as static water meters or other metering applications including gas meters. The metal formed antenna 104 can be mounted on a plastic substrate to facilitate mass manufacturing while controlling antenna radiation performance.

The mechanical structure of the antenna assembly 100 can be designed to achieve omni-directional radiation performance across low to high frequency bands. This unique polarization ensures efficient performance. As discussed above, the assembly process can be simplified, requiring only two-point soldering and press fitting to attach the antenna to the electronic PCB.

The plastic structure of the antenna can be designed to support the radiating element, control variations, and accommodate an electronic PCB with multiple ribs. Importantly, the plastic structure can be engineered to facilitate the easy flow of potting material. This can ensure that the electronics can be effectively protected from environmental factors such as water ingress without compromising the antenna’s performance. Overall, these design features make the antenna assembly both efficient and reliable for mass production and deployment in various IoT applications.

Figure 3:
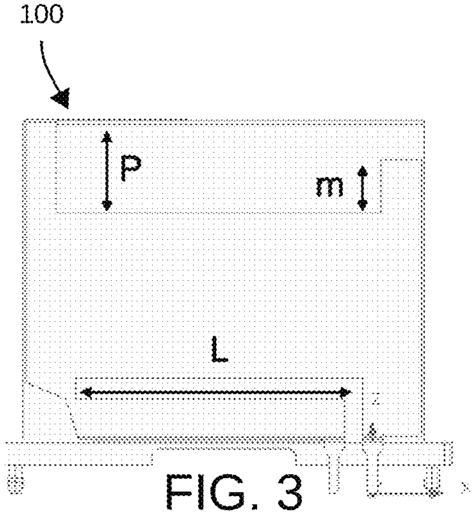
FIG. 3 illustrates a side view of the antenna assembly, in accordance with an embodiment.
Figure 4:
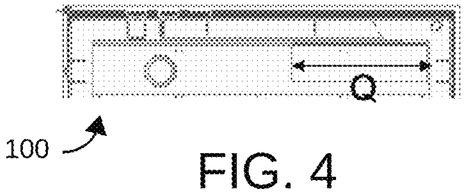
FIG. 4 illustrates a top cut-away view of the antenna assembly, in accordance with an embodiment.
Figure 5:
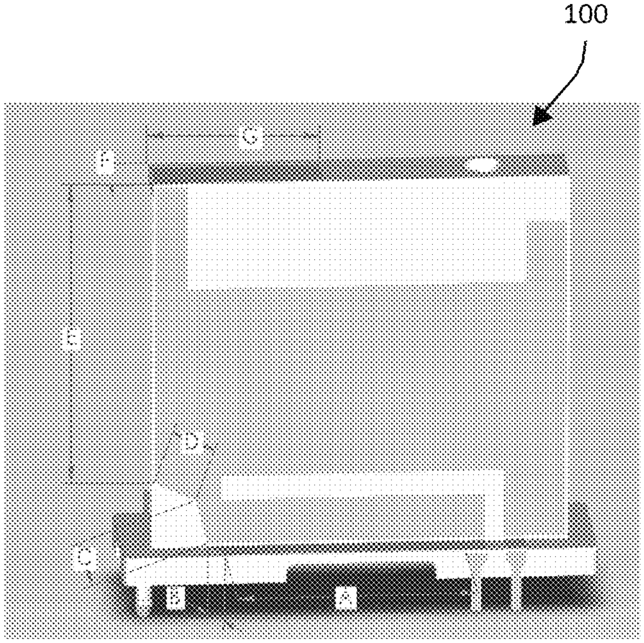
FIG. 5 illustrates another view of the antenna assembly, in accordance with an embodiment.

FIG. 3 illustrates a side view of the antenna assembly 100, in accordance with an embodiment. FIG. 4 illustrates a top cut-away view of the antenna assembly 100, in accordance with an embodiment. FIG. 5 illustrates another view of the antenna assembly 100, in accordance with an embodiment. The configuration of the antenna assembly 100 shown in FIG. 3, FIG. 4, and FIG. 5 can be implemented, for example, as a Planar Inverted F-Antenna (PIFA) Quarter wavelength antenna with ~110 mm length (A+B+C+D+E+F+G as shown in the figures) to operate, for example, in NBIOT Bands B1 (2100), B3 (1800), B5 (850), B8 (900), B20 (800) as a main radiating patch. Slot L, P and radiating element Q, m length can be derived for resonant frequency in high Frequency band at 1.75 GHz (B3) and to improve return loss. The position of the feeding point and the shorting plates can be derived to obtain the best results.

Note that the aforementioned PIFA antenna can be designed to operate efficiently within a limited space and can possess a compact, planar structure. The PIFA antenna may include a metal plate with a protruding section (resembling an inverted F shape) and a ground plane beneath it. The quarter-wavelength refers to the length of the antenna element, which is typically a quarter of the wavelength of the radio frequency it is designed to transmit or receive.

Figure 6:
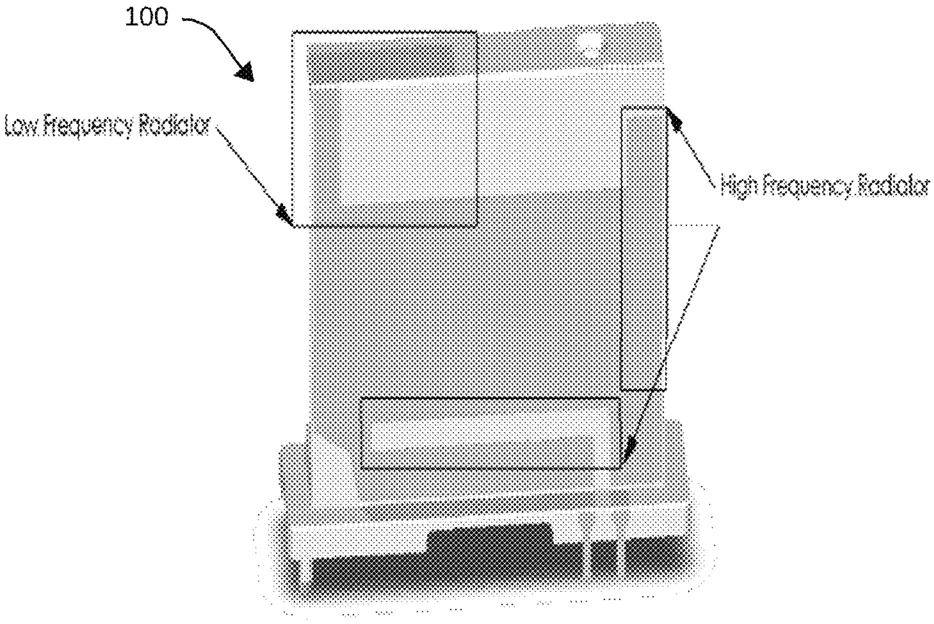
FIG. 6 illustrates a view of the antenna assembly with one or more radiator elements such as a low frequency radiator and a high frequency radiator, in accordance with an embodiment.

FIG. 6 illustrates a view of the antenna assembly 100 with one or more radiator elements such as a low frequency radiator and a high frequency radiator, in accordance with an embodiment. Note that in the context of the antenna assembly 100, the terms “low frequency radiator” and “high frequency radiator” can relate to radiator elements within the antenna structure that can be optimized to efficiently radiate electromagnetic waves at different frequency ranges.

A low frequency radiator is a type of radiator element, which can relate to a component of the antenna that can be designed to effectively emit electromagnetic waves at lower frequencies within the operational spectrum. In the embodiment depicted in FIG. 6, the low frequency radiator may be engineered to excel in transmitting signals at frequencies corresponding to lower LTE bands, such as, for example, Bands B5 (850 MHz) and B20 (800 MHz). This portion of the antenna assembly 100 may be crucial for ensuring reliable communication in these frequency bands, which can be used for long-range communication and penetrating obstacles.

On the other hand, a high frequency radiator is a type of radiator element, which relates to a component of the antenna assembly 100 that can be tailored to efficiently radiate electromagnetic waves at higher frequencies within the operational spectrum. In this embodiment, the high frequency radiator is a radiator element that can be optimized for transmitting signals at frequencies associated with higher LTE bands, such as, for example, Band B3 (1800 MHz) and potentially others like Band B1 (2100 MHz).

FIG. 6 therefore illustrates the antenna assembly 100 with radiator elements including the low frequency radiator and the high frequency radiator, each strategically positioned and optimized to meet the specific requirements of their respective frequency bands. The configuration of the antenna assembly 100 may involve elements such as slot L, slot P, and radiating element Q, which can be configured to resonate at specific frequencies within the high frequency band (e.g., 1.75 GHz for Band B3) to enhance return loss and overall antenna performance. Additionally, the positioning of the feeding point and shorting plates is likely optimized to achieve optimal performance across the entire frequency range of operation.

Note that the feeding point and shorting plates can play crucial roles in shaping the antenna's electrical characteristics and performance. The feeding point relates to the location on the antenna where the electrical signal is introduced or extracted. The feeding point is typically where the antenna is connected to the transmission line, which carries the radio frequency (RF) signal to and from the antenna. The design and placement of the feeding point can be critical for achieving desired radiation patterns, impedance matching, and overall antenna performance. Proper positioning of the feeding point can facilitate efficient transfer of RF energy between the transmission line and the antenna structure.

The shorting plates, also known as parasitic elements or directors, can be implemented as additional metallic elements placed near the main radiating element of the antenna. They are not connected to the feed line but influence the antenna's radiation pattern and characteristics by altering the distribution of electromagnetic fields around the antenna structure. Shorting plates can be used in antenna configuration to enhance directivity, gain, or impedance matching. Their size, shape, and placement can be carefully engineered to achieve specific performance goals, such as focusing radiation in desired directions or improving antenna bandwidth.

In the context of the antenna assembly 100, the positioning and design of both the feeding point and shorting plates can be optimized to ensure optimal performance across the frequency bands of interest (e.g., low frequency and high frequency bands). The feeding point can facilitate efficient coupling of the RF signal to the antenna structure, while the shorting plates may be strategically positioned to modify the antenna's radiation pattern or impedance characteristics, contributing to enhanced overall performance.

Note that the antenna assembly 100 can be implemented in the context of a low-cost wideband antenna that can be designed to meet the demands of modern connectivity, featuring a ground plane on a PCB and a robust plastic substrate, which can be crafted from PC and ABS to support the metal structure of the antenna. The metal radiating element, composed of, for example, SSU304 Steel with nickel plating, can be mounted onto the plastic substrate using, for example, heat staking techniques.

Despite space constraints and the proximity of metal components such as batteries, LCDs, and NFC coils, the quarter-wavelength antenna structure is expertly bent to fit within limited areas while achieving, for example, an impressive 18 dBm TRP for wideband LTE NB-IoT band frequencies ranging from 800 MHz to 2100 MHz. The main radiating element, strategically positioned above the ground plane, can use multiple branches to ensure coverage across the wideband spectrum. A feeding leg (e.g., such as the feeder leg 107) can support the first branch, coupling it to an RF feeding port and impedance matching network, while a ground leg (e.g., such as the ground leg 109 shown in FIG. 7) can support the second branch, ensuring electrical coupling to the PCB ground plane.

With a plastic substrate meticulously engineered to control antenna radiation performance variations, the antenna assembly 100 can be optimized for mass manufacturing, offering ease of assembly through two-point soldering and press-fit techniques. Furthermore, by directly soldering the antenna to the RF feeding port, potential performance issues associated with RF connectors under potting material can be effectively eliminated. Partial potting of the antenna not only shields electronics from harsh environmental conditions but also maintains exceptional radiation performance, making this antenna an exemplary solution for diverse connectivity needs.

As discussed above, in some embodiments the antenna 104 may be a PIFA quarter wavelength antenna with, for example, a ~110 mm length to operate in NBIOT wideband frequencies B1 (2100), B3 (1800), B5 (850), B8 (900), B20 (800). Antenna metal unique structure/slots can help to achieve >35% efficiency for NBIOT wideband frequencies with the proximity of metal components such as, for example, a battery, LCD, NFC coil and/or other types of metal components. Additionally, the antenna assembly 100 is easy to assemble with direct soldering to PCB, which can provide reliable performance for IP68 requirement in submerged applications.

Note that in the context of the antenna assembly 100, "IP68" typically means that the device, such as the antenna mentioned, is "IP68 compliant." This indicates that the device meets a specific standard of protection against solid particles (such as dust) and water intrusion.

The IP (Ingress Protection) rating system is an internationally recognized standard (defined by the IEC 60529 standard) that classifies the degrees of protection provided by electrical enclosures against intrusion, dust, accidental contact, and water. The first digit in the IP rating refers to protection against solid particles, while the second digit refers to protection against liquids.

In the case of "IP68," the "6" indicates that the device is completely dust-tight, meaning it is protected against dust ingress to the extent that it does not interfere with the operation of the device. The "8" indicates that the device is protected against the effects of continuous immersion in water beyond 1 meter depth. Therefore, an IP68 compliant antenna is both dust-tight and waterproof, making it suitable for submerged applications and offering robust protection against environmental factors.

Figure 7:
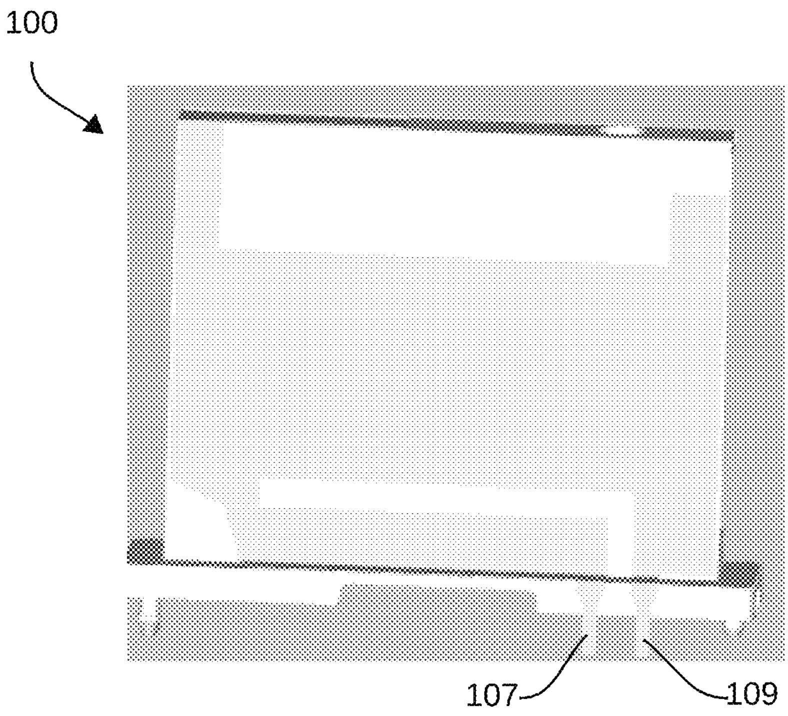
FIG. 7 illustrates a side perspective view of the antenna assembly with a feeder leg and a ground leg, in accordance with an embodiment.

FIG. 7 illustrates a side perspective view of the antenna assembly 100 with the feeder leg 107 and the ground leg 109, in accordance with an embodiment. As shown in FIG. 7, the feeder leg 107 and the ground leg 109 can each extend downward and away from the antenna assembly 100. It should be appreciated, however, that the feeder leg 107 and ground leg 108 are considered as parts of the antenna assembly 100.

The antenna assembly 100 described herein along with methods of configuring including design and manufacturing of the antenna assembly 100 provide a number of advantages. For example, the implementation of antenna assembly 100 can result in enhanced business revenue. That is, reliable communication is crucial for businesses, especially those operating in areas with poor network coverage. By providing a solution that ensures reliable communication for devices even in such environments, the antenna assembly 100 can directly contribute to enhancing business revenue. This reliability can translate into improved operational efficiency, reduced downtime, and enhanced customer satisfaction, all of which can positively impact revenue generation.

The antenna assembly 100 also can offer superior performance compared to off-the-shelf options, exceeding 18 dBm for all 5 frequency bands. This high level of performance can ensure reliable connectivity even in challenging network conditions, further enhancing the value proposition for customers. The ability to maintain such performance while fitting within a constrained space sets the solution apart from competitors, making it a compelling choice for businesses seeking reliable communication solutions.

The antenna assembly 100 can be designed for easy manufacture and assembly. This not only reduces production costs but can also streamline the deployment process, allowing businesses to quickly integrate the solution into their devices or infrastructure without significant time or resource investment.

The antenna assembly 100 can also be implemented with a compact design. With a height limit of 85 mm, for example, from the center of the flow tube, the antenna assembly can be compact and physically fits into constrained spaces. This compact design can ensure compatibility with various devices and installations, enabling businesses to deploy the solution in a wide range of applications without compromising on performance or aesthetics.

The antenna assembly 100 can also be easily migratable to any carrier and geography without sacrificing radiation performance. This flexibility allows businesses to adapt to changing network requirements or expand into new markets without the need for costly hardware modifications or replacements. It also future-proofs the solution, ensuring continued relevance and value over time.

The antenna assembly 100 and its method(s) of configuration offer significant advantages for businesses, including enhanced revenue generation through reliable communication, superior performance compared to off-the-shelf options, ease of manufacture and assembly, compact design for constrained spaces, and flexibility for migration to different carriers and geographies. These advantages make the solution a compelling choice for businesses and/or users seeking reliable and scalable communication solutions.

Based on the foregoing, it can be appreciated that a number of different embodiments are disclosed herein. For example, in an embodiment an antenna assembly can include a ground plane on a printed circuit board, a plastic substrate that supports an antenna, a metal radiating element mounted to the plastic substrate, and a radiating element mounted above the ground plane and including multiple branches above the ground plane to achieve wideband frequencies.

In an embodiment, a feeding leg can support a first branch of the radiating element above the ground plane and electrically coupling the first branch to an RF feeding port and impedance matching network.

In an embodiment, a ground leg supporting a second branch of the radiating element above the ground plane and electrically coupling the second branch to the ground plane.

In an embodiment, a second plastic substrate may be implemented, which can facilitate control of the antenna radiation performance variation for mass manufacturing of the antenna.

In an embodiment, the antenna can comprise an antenna metal structure.

In an embodiment, the antenna can comprise a quarter wavelength antenna structure/pattern bent to fit within a limited area and in proximity to a plurality of metal components and which can be slotted to achieve wideband band frequencies.

In an embodiment, the antenna can be configured with two-point soldering and a press fit.

In an embodiment, the antenna can be directly solderable to an RF feeding port.

In an embodiment, the antenna can be partially potted.

In an embodiment, antenna assembly can comprise an antenna attached to an electronic printed circuit board (PCB) utilizing a dual-point solder connection and a mechanical press attachment, wherein the configured is modified to achieve a desired omni-directional radiation performance while adhering to size constraints for the antenna and accommodating a presence of metal components in close proximity to the antenna assembly.

In an embodiment, the dual-point solder connection can be provided by two-point soldering and the mechanical press attachment can be implemented by press fitting of the antenna to the electronic PCB.

In an embodiment, a gasket can be implemented, which is operable to protect electronics through antenna soldering joints against dust and water ingress.

In an embodiment, the antenna can be implemented as a quarter wavelength LTE IoT antenna with a planar inverted structure. The antenna can be operable across wideband frequencies ranging from approximately 800 MHz to 2100 MHz. Furthermore, the antenna can be operable with a radiation performance exceeding 18 dBm.

In an embodiment, a method of configuring an antenna assembly, can involve: attaching an antenna to an electronic printed circuit board (PCB) utilizing a dual-point solder connection and a mechanical press attachment, and modifying the antenna to achieve a desired omni-directional radiation performance while adhering to size constraints for the antenna and accommodating a presence of metal components in close proximity to the antenna assembly.

In an embodiment of the method, the dual-point solder connection can be provided by two-point soldering.

In an embodiment of the method, the mechanical press attachment can be implemented by press fitting of the antenna to the electronic PCB.

An embodiment of the method can further involve configuring a gasket to protect electronics through antenna soldering joints against dust and water ingress.

In an embodiment of the method, the antenna can be implemented as a quarter wavelength LTE IoT antenna with a planar inverted structure.

In an embodiment of the method, the antenna can be implemented to operate across wideband frequencies ranging from approximately 800 MHz to 2100 MHz.

In an embodiment of the method, the antenna can be implemented to operate with a radiation performance exceeding 18 dBm.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An antenna assembly, comprising:

a ground plane formed on a printed circuit board;

a plastic substrate mounted on, and disposed perpendicular to, the printed circuit board;

a metal radiating element mounted to the plastic substrate above the ground plane and including multiple branches above the ground plane to achieve wideband frequencies;

a gasket located above the printed circuit board with respect to the ground plane and surrounding a portion of the metal radiating element;

a feeding leg extending through the printed circuit board, the feeding leg electrically coupled to a first branch of the radiating element and adapted to couple the first branch to an RF feeding port; and a ground leg extending through the printed circuit board, the ground leg electrically coupling a second branch of the radiating element to the ground plane.

2. The antenna assembly of claim 1 wherein the antenna comprises an antenna metal structure.

3. The antenna assembly of claim 1 wherein the antenna comprises a quarter wavelength antenna structure/pattern bent to fit in a limited area and in proximity to a plurality of metal components and slotted to achieve wideband band frequencies.

4. The antenna assembly of claim 1 wherein the antenna is configured with two-point soldering and a press fit.

5. The antenna assembly of claim 1 wherein the antenna is directly solderable to an RF feeding port.

6. The antenna assembly of claim 1 wherein the antenna is partially potted.

* * * * *